United States Patent [19]

Rauh

[11] Patent Number: 4,953,805

[45] Date of Patent: Sep. 4, 1990

[54] METHOD OF AND APPARATUS FOR DELIVERING WEBS OF PHOTOSENSITIVE MATERIAL TO A PRINTER

[75] Inventor: Hans-Jürgen Rauh, Munich, Fed. Rep. of Germany

[73] Assignee: Agfa-Gevaert Aktiengesellschaft, Leverkusen, Fed. Rep. of Germany

[21] Appl. No.: 272,101

[22] Filed: Nov. 16, 1988

[30] Foreign Application Priority Data

Dec. 2, 1987 [DE] Fed. Rep. of Germany ....... 3740806

[51] Int. Cl.$^5$ .............................................. B65H 19/12
[52] U.S. Cl. .................................. 242/58.6; 242/68.3; 414/276; 414/278; 414/911
[58] Field of Search .................................. 242/58–58.6, 242/79, 68.3; 414/267, 268, 276, 278, DIG. 911

[56] References Cited

U.S. PATENT DOCUMENTS

| | | | |
|---|---|---|---|
| 3,877,653 | 4/1975 | Foltyn | 242/79 X |
| 4,441,662 | 4/1984 | Seragnoli | 242/58.6 X |
| 4,466,579 | 8/1984 | Nitsch et al. | 242/67.1 R |
| 4,469,291 | 9/1984 | Treiber et al. | 242/191 |
| 4,589,811 | 5/1986 | Riccardo et al. | 242/58.6 X |
| 4,798,349 | 1/1989 | Manservisi | 242/58.6 X |

Primary Examiner—John M. Jillions
Attorney, Agent, or Firm—Peter K. Kontler

[57] ABSTRACT

Rolls of webs of photosensitive paper are accumulated into a stack on the upper reach of a belt conveyor which slopes upwardly and has a prop for the lowermost roll of the stack. The topmost roll of the stack is transferred to an unwinding station by an inflatable mandrel which is mounted on a pivotable lever and is movable by the lever between a horizontal position at the unwinding station and an inclined position in which it extends into and can be inflated in the interior of the core of the topmost roll of the stack. A catcher locates the leader of the web on the roll at the unwinding station and delivers the leader into the nip of two transporting rollers which advance the leader into a printer. When the supply of web on the core at the unwinding station is exhausted, the empty core is separated from the mandrel by a stripping device and the mandrel is ready to remove the next topmost roll from the upper reach of the conveyor. Such topmost roll is advanced to an optimum level for engagement of its core by the mandrel not later when the lever is pivoted again to tilt the mandrel and to thus move it into the core of the topmost roll.

32 Claims, 2 Drawing Sheets

METHOD OF AND APPARATUS FOR DELIVERING WEBS OF PHOTOSENSITIVE MATERIAL TO A PRINTER

BACKGROUND OF THE INVENTION

The invention relates to improvements in methods of and in apparatus for delivering photosensitive materials, such as webs of convoluted printing paper, to a processing machine, especially to a printer. More particularly, the invention relates to improvements in methods of and in apparatus for automatically delivering photosensitive material to a printer or another processing machine at the frequency at which successive webs of convoluted photosensitive material are processed or consumed in the machine.

Commonly owned U.S. Pat. No. 4,469,291 to Treiber et al. discloses an apparatus which serves to transfer webs of photosensitive material between discrete cassettes and a processing machine, e.g., a photographic copying machine. Cassettes which can be used in the apparatus of Treiber et al. are disclosed in commonly owned U.S. Pat. No. 4,466,579 to Nitsch et al. A drawback of apparatus which are used to withdraw webs of photosensitive material from, or to introduce such material into, discrete cassettes is that each and every roll consisting of a core and a web of convoluted photosensitive material on the core must be confined in a discrete housing and the support for the core must be combined with braking means and other components which contribute tho the bulk and cost of the cassettes and of the entire apparatus. In addition, it is necessary to continuously monitor the cassette which is in the process of delivering a web to or in the process of receiving a web from a printer or another machine. This also contributes to the cost of treatment of such webs. Empty cassettes must be individually replaced with filled cassettes and vice versa.

In accordance with another prior proposal, several cassettes for discrete rolls of photosensitive material are mounted on a vertical turntable which is indexable to move successive empty cassettes to optimum positions for reception of webs or to move successive filled cassettes to optimum positions for delivery of their webs to a processing machine. Since each cassette is designed to contain a long web of photosensitive material, the combined bulk of a number of cassettes contributes to often excessive space requirements of such apparatus and renders it necessary to employ a heavy turntable which must be indexed by a strong motor with attendant consumption of substantial amounts of energy. It is further necessary to provide expensive accelerating, decelerating and braking means for the turntable and the cassettes thereon.

In order to avoid the need for an exchange of individual, normally wheel-mounted, cassettes of the type disclosed in the aforementioned U.S. Pat. No. 4,466,579 to Nitsch et al., it was already proposed to dispose several mobile cassettes at each side of a printer and to automatically shift freshly emptied and/or freshly filled cassettes from positions for withdrawal of photosensitive material or for introduction of photosensitive material. Alternatively, a control system can be designed to regulate the operation of a mobile web threading unit which can be shifted from cassette to cassette at the printing station. Reference may be had to commonly owned U.S. patent applications Ser. Nos. 175,160 now U.S. Pat. No. 4,853,742 (filed Mar. 30, 1988 by Payrhammer et al.) and 175,161 now U.S. Pat. No. 4,843,430 (filed Mar. 30, 1988 by Huber et al.). Such apparatus contribute significantly to automation of the operation; however, they still employ discrete cassettes for rolls of convoluted photosensitive material which contributes to the cost and bulk of the apparatus.

Commonly owned German patent application No. 37 34 896 describes another proposal according to which webs of photosensitive material must be convoluted onto specially designed cores. This, too, entails a pronounced increase of the cost due to the need for specially designed cores. Moreover, such apparatus cannot accept rolls wherein the webs of photosensitive material are convoluted on conventional cores.

OBJECTS OF THE INVENTION

An object of the invention is to provide a method of delivering webs of photosensitive material to a processing machine, such as a printer, at the required frequency and directly from conventional cores for such webs.

Another object of the invention is to provide a method which renders it possible to store a large number of webs of photosensitive material in immediate proximity to the processing machine, in a small area and in such a way that successive webs can be fed into the processing machine with minimal interruptions for removal of the cores of spent rolls.

A further object of the invention is to provide a method which renders it possible to automate all, or practically all, phases of the web delivering operation.

An additional object of the invention is to provide a method which can be practiced in conjunction with available cores for webs of photosensitive material and for delivery of such webs into existing printing and other web processing machines.

Still another object of the invention is to provide a novel and improved apparatus for the practice of the above outlined method and to construct and assemble the apparatus in such a way that its space requirements are a relatively small, or even a minute, fraction of the space requirements of conventional apparatus.

A further object of the invention is to provide the apparatus with novel and improved means for storing a large number of convoluted webs of photosensitive material in a small area and in such orientation that the convoluted webs are in optimum positions for delivery to an unwinding station.

An additional object of the invention is to provide a novel and improved apparatus for manipulating rolls of webs of photosensitive material which are convoluted on standard cores, e.g., on cores which are made of cardboard.

A further object of the invention is to provide the apparatus with novel and improved means for manipulating the rolls of convoluted webs between a magazine and the unwinding station.

Another object of the invention is to provide the apparatus with novel and improved means for expelling the cores of expired rolls from the unwinding station.

An additional object of the invention is to provide the apparatus with novel and improved means for threading the leaders of successive webs of photographic material into the processing machine.

Another object of the invention is to provide an apparatus which need not employ cassettes for rolls of convoluted photosensitive material and wherein all operations can be automated in a simple but highly efficient manner.

A further object of the invention is to provide the apparatus with novel and improved means for transporting convoluted webs of photosensitive material to the unwinding station.

Another object of the invention is to provide the apparatus with novel and improved means for locating the leaders of webs at the unwinding station.

SUMMARY OF THE INVENTION

One feature of the present invention resides in the provision of a method of delivering to a processing machine (such as a printer) successive webs of photosensitive material (such as photographic paper) which are convoluted on cores to form therewith rolls and each of which has a leader which is remote from the respective core. The method comprises the steps of gathering a plurality of rolls into a stack of substantially coaxial rolls and establishing for the stack a sloping path wherein the common axis of the rolls is slightly inclined with reference to the horizontal (preferably at an angle of less, most preferably much less, than 30 degrees) and the stack includes a topmost roll at a predetermined level and a lowermost roll, propping the lowermost roll of the stack against overturning under the action of gravity and/or under the weight of other rolls in the stack, removing the topmost roll of the stack from the path including tilting the topmost roll so that the axis of such roll is substantially horizontal and moving the roll (prior, during or subsequent to tilting) away from the neighboring roll of the stack to an unwinding station, threading the leader of the web at the unwinding station into the processing machine and unwinding the web from the respective core, advancing the remainder of the stack along the sloping path until the topmost roll of the remainder of the stack reaches the predetermined level, expelling the empty core from the unwinding station upon completion of the unwinding step, and removing the topmost roll of the remainder of the stack from the sloping path.

Each removing step preferably includes introducing into the core of the roll at the predetermined level an expandable and contractible mandrel, expanding the mandrel in the core, tilting the mandrel with the core thereon and preferably simultaneously moving the mandrel and the core thereon away from the neighboring roll of the stack in the sloping path and on to the unwinding station. The expelling step can include contracting the mandrel at the unwinding station and pushing the core off the contracted mandrel.

The method preferably further comprises the steps of monitoring the sloping path and generating a signal when the topmost roll of the remainder of the stack reaches the predetermined level, and utilizing the signal to terminate or interrupt the advancing step. The monitoring step can include photoelectrically scanning the sloping path, and the advancing step can include moving the remainder of the stack along the sloping path by a motor-driven endless conveyor (e.g., a belt or chain conveyor).

Another feature of the invention resides in the provision of an apparatus for delivering to a processing machine (such as the aforementioned printer) successive webs of photosensitive material which are convoluted on cores to form therewith rolls and each of which has a leader remote from the respective core. The apparatus comprises a conveyor (e.g., an endless belt or chain conveyor) which defines a sloping path and serves to support a stack which consists of coaxial rolls and has an axis that is slightly inclined with reference to the horizontal so that the stack has a topmost roll which is located at a predetermined level and a lowermost roll, means (e.g., a back support) on the conveyor for propping the lowermost roll of the stack in the sloping path so that the lowermost roll is held against overturning under the action of gravity and/or under the weight of other rolls in the stack, means defining an unwinding station which is adjacent but spaced apart from the topmost roll of the stack on the conveyor, means for transferring the topmost roll of the stack to the unwinding station including a rotary transfer member which is movable between a first position at the unwinding station and a second position of engagement with the core of the topmost roll at the predetermined level and means for moving the transfer member between the two positions, means for unwinding the web from the core of the roll at the unwinding station including means for rotating the core, means for threading the leader of the web at the unwinding station into the processing machine, means for expelling the core from the unwinding station upon completed unwinding of the web from such core, and means for advancing the conveyor stepwise so as to advance successive rolls to the predetermined level upon completed transfer of the topmost roll from the sloping path to the unwinding station.

The apparatus can further comprise a magazine for the conveyor and a light barrier between the magazine and the unwinding station.

The means for moving the transfer member can include means for tilting the transfer member so that the axis of rotation of the transfer member is substantially horizontal in the first position and such axis coincides with the common axis of the rolls in the stack on the conveyor in the second position of the transfer member. The tilting means can include a lever and means for pivoting the lever about an axis which is or can be normal to the axis of rotation of the transfer member.

Control means can be provided to operate the advancing means, the moving means, the unwinding means, the expelling means and the transferring means in a predetermined sequence.

The transfer member can include an expandable and contractible or collapsible mandrel which is insertable into the core of the roll at the predetermined level in contracted or collapsed condition and is thereupon expandable to engage and hold the core from within. The expelling means can include means for stripping empty cores off the mandrel at the unwinding station. The expelling means can be mounted on the aforementioned lever for the transfer member so that the transfer member and the expelling means move jointly along an arcuate path which is defined by the lever. The moving means can further comprise a fluid-operated (e.g., pneumatic) motor which serves to pivot the lever.

The expelling means can comprise an abutment or stop (e.g., a disc-shaped abutment) for the roll which is engaged by the transfer member, and means for displacing the abutment relative to the transfer member so as to disengage the core of the roll at the unwinding station from the transfer member.

The apparatus can further comprise means for monitoring the sloping path for the presence of rolls at the predetermined level, and such monitoring means includes means for generating signals in the absence of a roll at and the predetermined level or in response to detected presence of a roll at such level. The advancing means is responsive to signals from monitoring means to set the conveyor in motion until roll of the stack on the conveyor reaches the predetermined level.

The monitoring means can include photoelectric detector means, and the advancing means can comprise an electric motor.

The threading means can comprise a catcher for the leader of the web at the unwinding station and means for moving the catcher relative to the roll at the unwinding station (e.g., for pivoting the catcher with reference to the roll at the unwinding station). The catcher can comprise a sensor which serves to generate a signal in response to detection of the leader of the web at the unwinding station, and means for attracting the leader by suction in response to such signal. The catcher can further comprise guide means for the web at the unwinding station, and the attracting means can include one or more suction cups. The threading means preferably also comprises web transporting means which is spaced apart from the unwinding station, and the means for moving the catcher can comprise means for moving the attracting means between the unwinding station and the transporting means so that the leader of the web can be engaged and entrained by the transporting means. Such transporting means can include a pair of rollers which define a nip for the web.

The threading means can also comprise means for looping the web between the unwinding station and the transporting means. Such looping means can comprise a tensioning roller and means for moving the roller relative to the web portion between the unwinding station and the transporting means.

The apparatus can further comprise means for guiding the web from the transporting means to the processing machine. Such guiding means can comprise a mobile guide member and means for moving (e.g., pivoting) the guide member between a first position in which the guide member directs the leader of the web from the transporting means into the processing machine and a second position in which the web is free to form a loop between the transporting means and the processing machine. Means (such as a photoelectric detector) can be provided to monitor the size of the loop downstream of the transporting means.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF PREFERRED EMBODIMENTS

Figure 1:
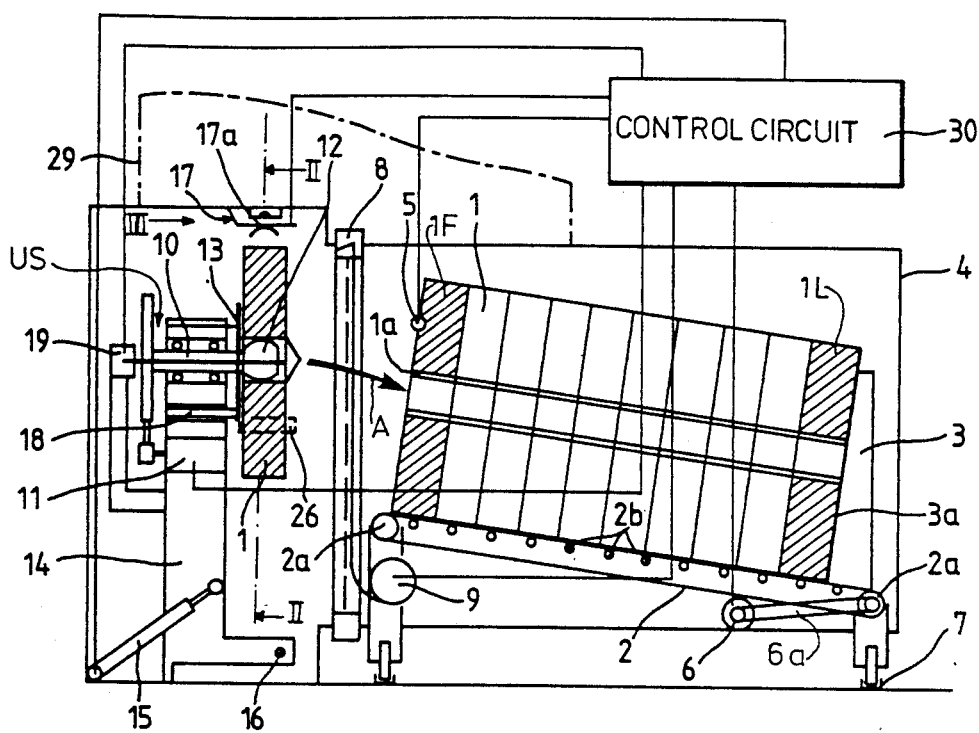
FIG. 1 is a schematic elevational view of an apparatus which embodies the invention, the front wall of the housing of the magazine for the stack of rolls of photosensitive material being omitted and three of the rolls being shown in an axial sectional view.

The drawing shows an apparatus wherein the housing 4 of a magazine confines an endless belt conveyor 2 having an elongated upper reach which supports a stack of coaxial rolls 1 each having a core 1a (e.g., a standard core of cardboard) and a web W of photographic paper which is convoluted on the core and has a leader L remote from the core. The purpose of the apparatus is to deliver the leaders L of successive webs W into a processing machine 29, particularly into a printer wherein the photosensitive material receives images of successive film frames on customer films in a manner not forming part of the present invention. The reference character 31 denotes a channel wherein the webs W advance from an unwinding station US int o the processing machine 29.

The upper reach of the conveyor 2 is slightly inclined with reference to the horizontal (e.g., at an angle of not more than ten degrees). The conveyor 2 is trained over two pulleys 2a one of which is connected to the output element of an electric motor 6 by a belt or chain 6a so that it can advance the conveyor 2 stepwise in a direction to move the stack of rolls 1 upwardly toward the unwinding station US. The upper reach of the conveyor 2 is located above a row of idler rollers 2b or in any other suitable way so that it does not sag under the weight of the stack of coaxial rolls 1 thereon. The motor 6 receives "start" and "stop" signals from a monitoring device 5 (preferably a photoelectric detector) through the intermediary of a control circuit 30. The upper reach of the conveyor 2 carries a propping device 3 in the form of a back support for the lowermost roll 1L of the stack, and such propping device has a surface 3a which abuts the adjacent (rear) side of the roll 1L and is disposed at right angles to the plane of the upper reach of the conveyor 2. The purpose of the propping device 3 is to prevent the roll 1L from overturning under the action of gravity (in view of the aforediscussed inclination or slope of the upper reach of the conveyor 2) and/or under the weight of adjacent rolls 1 in the housing 4 of the magazine for the belt conveyor.

The monitoring device 5 is installed in the frame of the apparatus at a predetermined level so that it can ascertain the presence or absence of the foremost or topmost roll 1F at a predetermined optimum distance from the unwinding station US. The transducer of the monitoring device 5 is connected with the corresponding input of the control circuit 30 which, in turn, is connected with the controls of the motor 6 for the conveyor 2. The arrangement is such that the motor 6 is automatically arrested when the control circuit 30 receives from the monitoring device 5 a signal denoting that the foremost or topmost roll 1F of the stack of rolls 1 on the conveyor 2 has arrived at the predetermined level and is thus ready for transfer to the unwinding station US. Inversely, the control circuit 30 automatically starts the motor 6 when the transducer of the monitoring device 5 transmits a signal denoting the absence of a roll at the predetermined level.

The purpose of slight upward slope of the upper reach of the conveyor 2 is to prevent successive foremost rolls 1F on the upper reach of this conveyor from tipping over toward the unwinding station US so that they would fail to assume positions which are necessary for reliable automatic transfer into the unwinding station.

Figure 2:
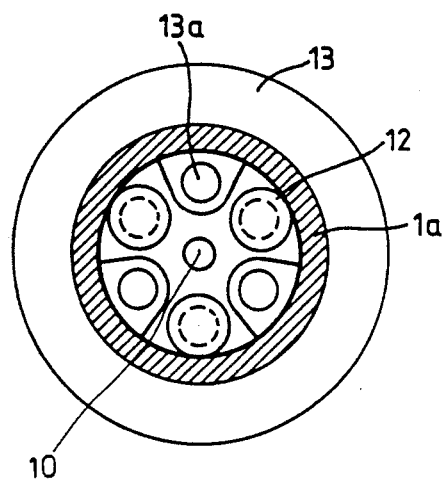
FIG. 2 is an enlarged sectional view of the transfer member and of the expelling means at the unwinding station, as seen in the direction of arrows from the line II—II of FIG. 1.

The transfer member which is employed to move successive foremost rolls 1F from the conveyor 2 to the unwinding station US includes a mandrel having a rotary shaft 10 and several inflatable tubes 12 which surround the shaft 10 and alternate with guide rods 13a for a disc-shaped abutment or stop 13 forming part of means for expelling empty cores 1a from the unwinding station US. The rods 13a are shown in FIG. 2 which further shows in section a conventional cylindrical core 1a of cardboard, plastic or metallic material. The shaft 10 and the inflatable tubes 12 of the mandrel are mounted on a level 14 which is pivotable about the axis of a horizontal pivot member 16 extending at right angles to the shaft 10 and enabling the lever 14 to pivot between the position of FIG. 1 and a second position in which the axis of the shaft 10 coincides with the axis of the topmost roll 1F on the conveyor 2 and the mandrel 1, 12 extends into the hollow core 1a of the topmost roll 1F. The means for pivoting the lever 14 (i.e., for moving the mandrel 10, 12 between its two positions) comprises a fluid-operated (preferably pneumatic) motor 15 which operates between the lever 14 and the frame of the improved apparatus. Signals for operation of the motor 15 are transmitted by the control circuit 30 in response to signals which denote the need for transferring the next topmost roll 1F from the conveyor 2 into the unwinding station US.

Figure 5:
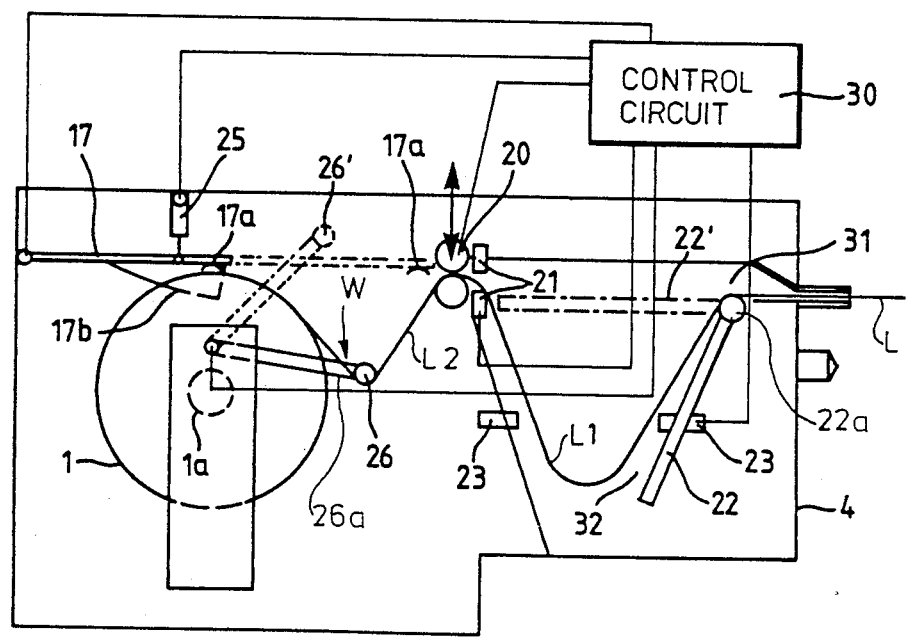
FIG. 5 is a view as seen in the direction of arrow V in FIG. 4.

The means for unwinding the web 1 from the core 1a at the station US comprises a motor 11 which rotates the shaft 10 of the inflatable and deflatable mandrel 10, 12 through the medium of a gear transmission in a clockwise direction (as seen in FIG. 5) so that the roll 1 pays out the web W for threading into the processing machine 29. The motor 11 receives "start" and "stop" signals from the control circuit 30, the same as a pusher 18 for the disc-shaped stop 13 of the means for expelling empty cores 1a from the unwinding station US. Such empty cores can be gathered in a suitable receptacle, not shown. A source 19 of compressed air or another suitable fluid is provided to inflate the tubes 12 of the mandrel in response to signals from the control circuit 30 in order to ensure that the mandrel engages the core 1a of the topmost roll 1F on the conveyor 2 from within and reliably holds such core during transport from the housing 4 to the unwinding station US as well as during unwinding and advancement of the web W into the processing machine 29. The tubes 12 of the mandrel are deflated preparatory to expulsion of an empty core 1a from the unwinding station US. Such expulsion involves a movement of the pusher 18 in a direction to move the stop 13 along the guide rods 13a and to thus strip the core 1a off the mandrel while the tubes 12 are at least slightly deflated. The expelled core 1a can descend into the aforementioned receptacle in the region between the shaft 10 and a light barrier 8 between the housing 4 and the unwinding station US. The light barrier 8 can comprise a flexible blind 9 which can be withdrawn from the path of movement of the mandrel 10, 12 between the conveyor 2 and the unwinding station US in response to signals from the control circuit 30 and is thereupon closed again so that the supply of rolls 1 in the housing 4 can be replenished or that the magazine can be replaced with a filled magazine while the roll 1 at the unwinding station US pays out its web W into the processing machine 29 by way of the channel 31.

The housing 4 is or can be mounted on wheels 7 so as to facilitate transport into and from the improved apparatus. The motor 6 preferably shares the movements of the housing 4. The latter can be designed with a removable, pivotable or otherwise movable top so as to permit a replenishing of the supply of rolls 1 on the upper reach of the conveyor 2 in front of the propping device 3. A suitable lifting and lowering means can be employed to introduce fresh rolls 1 into the magazine by way of the open top of the housing 4. The light barrier 8 can include a labyrinth seal of any known design. As mentioned above, signals to roll the blind 9 of the light barrier 8 up or down are transmitted by the control circuit 30 which serves to synchronize the movements of all mobile parts so as to ensure that the intervals between deliveries of successive webs W into the processing machine 29 are very short.

Figure 3:
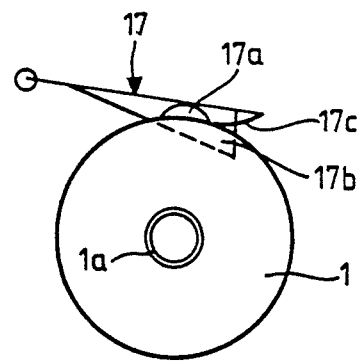
FIG. 3 is an elevational view of the catcher of the web threading means as seen in the direction of arrow III in FIG. 1.
Figure 4:
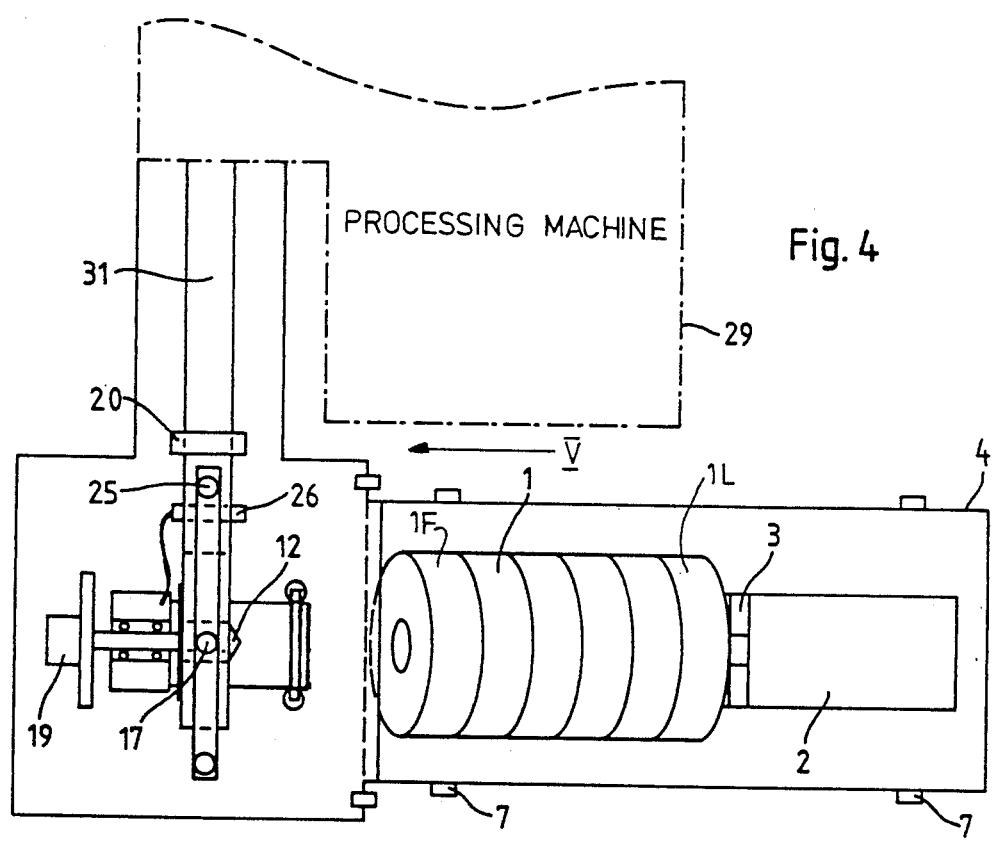
FIG. 4 is a plan view of the apparatus.

The path of movement of a web W from the unwinding station US into the processing machine 29 is monitored by several monitoring devices which preferably constitute or include photoelectric detectors. As can be seen in FIG. 5, a detector 21 monitors the path of movement of webs W immediately downstream of two transporting rollers 20 which constitute elements of the means for threading webs W into the processing machine 29 and transmit signals to the control circuit 30. The latter further receives signals from a photoelectric detector 23 which monitors the path of webs W downstream of the detector 21 and transmits a signal when the web W fails to form a loop L1 of proper size in a loop forming chamber 32 which is flanked in part by a tiltable or pivotable guide member 22 of the threading mechanism. When the detectors 21 and 23 transmit signals which indicate that the corresponding portions of the path for the web W between the unwinding station US and the processing machine 29 are empty, the control circuit 30 transmits a signal to the motor 15 which pivots the lever 14 (and hence the mandrel 10, 12 and the expelling means 13, 18) from the position of FIG. 1 in the direction of arrow A so as to ensure that the then deflated mandrel 10, 12 enters the core 1a of the topmost roll 1F which is maintained in a position of readiness at the level of the detector 5. At such time, the blind 9 of the light barrier 8 is lowered so that the mandrel 10, 12 is free to move between the level of the detector 5 and the unwinding station US. The tubes 12 of the mandrel 10 are thereupon inflated with fluid from the source 19 (in response to a signal from the control circuit 30) so that the core 1a of the roll 1F is engaged from within and is ready to be transferred into the unwinding station US. The circuit 30 then transmits a signal to the motor 15 which pivots the lever 14 back to the position of FIG. 1 in which the axis of the transferred roll 1 is horizontal and the leader L of the web W of such roll is ready to be located by the sensor 17c (FIG. 3) of a catcher 17. The two major sides of the roll 1 at the unwinding station US are then disposed in vertical planes. The control circuit 30 transmits a signal to raise the blind 9 so that the light barrier 8 between the interior of the housing 4 and the unwinding station US is again effective. The detector 5 transmits to the control circuit 30 a signal which denotes the absence of a roll 1 at the level of the roll 1F which is shown in FIG. 1 whereby the circuit 30 starts the motor 6 which drives the conveyor 2 so that the propping device 3 moves toward the unwinding station US and the foremost roll 1 of the remainder of the stack on the upper reach of the conveyor 2 advances to the level of the detector 5. The latter transmits a signal which causes the control circuit 30 to arrest the motor 6 so that the foremost roll 1 of the remainder of the stack o the conveyor 2 is then in a position of readiness for engagement of its core 1a by the mandrel 10, 12 in the course of the next removing step. The detector 5 can be designed to transmit to the control circuit 30 a signal as soon as the front side of the foremost roll 1 of the stack on the conveyor 2 reaches the beam of radiation which issues from the radiation source of the detector 5. When the supply of rolls 1 on the conveyor 2 is exhausted, the direction of rotation of the output element of the motor 6 can be reversed by the control circuit 30 or by hand so that the propping device 3 is returned to its lower end position and the upper reach of the conveyor 2 can receive a fresh stack of rolls 1. If the operation of the apparatus is not (or need not be) fully automated, the propping device 3 can be reset by hand.

Once a roll 1 is located at the unwinding station US, it is necessary to automatically thread the leader L of the web W of such roll into the processing machine 29. Such leader is then affixed (e.g., spliced) to a conventional entraining band (not shown) or directly to the trailing end of the preceding web. The splicing can take place in the channel 31 or in the processing machine 29. The threading mechanism comprises the catcher 17 which is pivotable by a pneumatically operated raising and lowering device 25, a tensioning roller 26 which can loop the web W downstream of the catcher 17 (as seen in the direction of advancement of the web W into the machine 29), the transporting rollers 20 which are spaced apart from the unwinding station US and define a nip for the leader L of the web W which is in the process of being threaded into the machine 29, and the tiltable or pivotable guide member 22 which can be pivoted by a motor 22a and is movably mounted between the transporting rollers 20 and the machine 29 to assume a first position 22' (indicated in FIG. 5 by phantom lines) and a second position (indicated in FIG. 5 by solid lines). In the first position 22,, the member 22 guides the leader L of a web W from the nip of the transporting rollers 20 into the processing machine 29. When the motor 22a is actuated by the control circuit 30 to move the guide member 22 to the solid-line position of FIG. 5, the member 22 defines the loop forming chamber 32 wherein the web W can form the loop L1 whose size is monitored by the photoelectric detector 23. The presence of absence of a web W immediately or closely downstream of the transporting rollers 20 is monitored by the photoelectric detector 21.

The means for actuating the raising and lowering device 25 for the catcher 17, the means 26a for moving the tensioning or loop forming roller 26 between the phantom-line position 26, and the solid-line position of FIG. 5, the means for driving the transporting rollers 20, and the means for actuating the motor 22a for the guide member 22 receive signals from the control circuit 30 in a predetermined sequence so as to ensure a fully automatic threading of the leader L of a web W which has been transferred to the unwinding station US.

When a fresh roll 1 has been delivered to the unwinding station US, the tensioning roller 26 is maintained in the phantom-line position 26, of FIG. 5 and the guide member 22 is held in the position 22, The guide member 22 is then disposed beneath the channel 31 and can guide the leader L from the nip of the transporting rollers 22 into the processing machine 29. The catcher 17 is also raised so that it does not interfere with transfer of the topmost or foremost roll 1F from the conveyor 2 into the unwinding station US. The control circuit 30 thereupon causes the catcher 17 to descend to the position of FIG. 5 in which the guide panels 17b (note FIG. 3) of the catcher flank the sides of the freshly transferred roll 1 at the station US and, as the roll 1 rotates at the station US, a sensor 17c of the catcher 17 detects the leader L and causes a suction cup 17a to attract the leader L. The pneumatically operated raising and lowering device 25 then moves with the catcher 17 in a direction to the right (as seen in FIG. 5) so that the leader L which is attracted by the suction cup 17a is introduced into the nip of the transporting rollers 20 which are set in motion and advance the leader L along the raised guide member 22 (in the position 22,) toward and into the processing machine 29. The detector 21 downstream of the transporting rollers 20 is designed to cause the control circuit 30 to lower the upper transporting roller 20 toward the lower transporting roller as soon as it detects the leader L of a web, and the control circuit 30 then starts the motor for the rollers 20 so that the leader L is compelled to advance toward and into the machine 29. When the splicing of the leader L to the entraining band or to the trailing end of the preceding web W is completed (either in the channel 31 or in the machine 29), the tensioning roller 26 is moved from the position 26, to the solid-line position of FIG. 5 and the guide member 22 is moved from the position 22' to the solid-line position. Thus, the web W is caused to form a loop L2 between the unwinding station US and the transporting rollers 22 as well as a loop L1 between the transporting rollers 20 and the machine 29.

The size of the loop L1 in the chamber 32 is monitored by the detector 23 whose signals are processed in the circuit 30 and are used to control the speed of the advancing rollers 20 so as to increase the size of the loop L1 if the detector 23 transmits a signal denoting the absence of web W in the lower portion of the chamber 32. If each of the detectors 21 and 23 transmits a signal denoting the absence of a web W in the corresponding portion of the path between the unwinding station US and the processing machine 29, the control circuit 30 is caused to arrest all prime movers and the apparatus comes to a halt.

When the supply of web W on the core 1a of the roll 1 at the unwinding station US has expired, signals from the detectors 21 and 23 (or signals from suitable detector means at the station US) are processed in the control circuit 30 to deflate the tubes 12 of the mandrel, and the pusher 18 is actuated to cause the abutment or stop 13 to strip the empty core 1a off the mandrel at the unwinding station US so that the mandrel is ready to be tilted by the lever 14 and to penetrate into the core 1a of the topmost or foremost roll 1F on the upper reach of the conveyor 2. Such penetration of the deflated or collapsed mandrel into the core 1a of the foremost roll 1F on the conveyor 2 is preceded by retraction of the abutment or stop 13 so as to provide room for the roll 1F on the mandrel. The mandrel is thereupon inflated (expanded) and is ready to transfer the roll 1F into the unwinding station US. The same procedure is repeated again and again as often as necessary.

An important advantage of the improved apparatus is that a roll 1F can be maintained in a state of readiness for transfer to the unwinding station US in an optimum position for engagement of its core by the deflated mandrel of the means for transferring rolls from the conveyor 2 in the housing 4 of the magazine to the unwinding station. Inclination of the axis of the roll 1F to the horizontal (while such roll is still supported by the conveyor 2) need not be pronounced, as long as it suffices to ensure that the roll 1F will not change its orientation by gravity to fall into the unwinding station or to otherwise interfere with movements of the mandrel between the unwinding station and the detector 5. This is in contrast to the operation of many conventional apparatus wherein heavy rolls or heavy cassettes for individual rolls must be transported through considerable distances on their way to the unwinding station. Since the distance between the detector 5 and the unwinding station US is very short, problems with acceleration and deceleration of rolls 1 during transfer from the conveyor 2 to the unwinding station are negligible or do not arise at all. Furthermore, the space requirements of the improved apparatus are a minute fraction of those of a conventional apparatus because the rolls 1 need not be confined in discrete cassettes but can be stacked in immediate proximity to each other.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. A method of delivering to a processing machine, such as a printer, successive webs of photosensitive material which are convoluted on cores and to form therewith rolls and each of which has a leader, comprising the steps of gathering a plurality of rolls into a stack of substantially coaxial rolls and establishing for the stack a sloping path wherein the common axis of the rolls is slightly inclined to the horizontal and the stack includes a topmost roll at a predetermined level and a lowermost roll; propping the lowermost roll of the stack against overturning under the action of gravity and/or under the weight of other rolls in the stack; removing the topmost roll of the stack from said path including tilting the topmost roll so that the axis of such roll is substantially horizontal and moving the roll away from the neighboring roll of the stack to an unwinding station; threading the leader of the web at said station into the processing machine and unwinding the web from the respective core; advancing the remainder of the stack along said path until the topmost roll of the remainder reaches said level; expelling the core from said station upon completion of the unwinding step; and removing the topmost roll of the remainder of the stack from said path.

2. The method of claim 1, wherein the photographic material is photographic paper.

3. The method of claim 1, wherein the inclination of said path to the horizontal is less than 30 degrees.

4. The method of claim 1, wherein said removing steps include introducing into the core of the roll at said level an expandable and contractible mandrel, expanding the mandrel in the core, tilting the mandrel with the core of the roll at said level, and moving the mandrel and the core away from the neighboring roll of the stack to said unwinding station.

5. The method of claim 4, wherein said expelling step includes contracting the mandrel at said station, and pushing the core off the contracted mandrel.

6. The method of claim 1, further comprising the steps of monitoring said path and generating a signal when the topmost roll of the remainder of the stack reaches said level, and utilizing said signal to terminate said advancing step.

7. The method of claim 6, wherein said monitoring step includes photoelectrically scanning said path and said advancing step includes moving the remainder of the stack along said path by a motor-driven endless conveyor.

8. Apparatus for delivering to a processing machine, such as a printer, successive webs of photosensitive material which are convoluted on cores and form therewith rolls and each of which has a leader, comprising a conveyor defining a sloping path and arranged to support a stack which consists of coaxial rolls and has an axis which is slightly inclined to the horizontal so that the stack has a topmost roll which is located at a predetermined level and a lowermost roll, said conveyor having means for propping the lowermost roll of the stack in said path against overturning under the action of gravity and/or under the weight of other rolls in the stack; means defining an unwinding station which is spaced apart from the topmost roll at said level; means for transferring the topmost roll of the stack to said station, including a rotary transfer member movable between a first position at said station and a second position of engagement with the core of the topmost roll at said level, and means for moving the transfer member between said positions; means for unwinding the web from the core of the roll at said station, including means for rotating the core; means for threading the leader of the web at said station into the processing machine; means for expelling the core from said station upon completed unwinding of the web therefrom; and means for advancing the conveyor so as to advance successive rolls to said predetermined level upon completed transfer of topmost rolls from said path.

9. The apparatus of claim 8, further comprising a magazine for said conveyor.

10. The apparatus of claim 8, wherein said means for moving said transfer member includes means for tilting the transfer member so that the axis of the transfer member is substantially horizontal in said first position and the axis of the transfer member coincides with the common axis of rolls in the stack on said conveyor in the second position of said transfer member.

11. The apparatus of claim 10, wherein said tilting means includes a lever and means for pivoting said lever about an axis which is normal to the axis of rotation of said transfer member.

12. The apparatus of claim 8, further comprising control means for operating said advancing, moving, unwinding, expelling and transferring means in a predetermined sequence.

13. The apparatus of claim 8, wherein said transfer member includes an expandable and contractible mandrel which is insertable into the core of the topmost roll at said level in contracted condition and is expandable to engage the core from within.

14. The apparatus of claim 13, wherein said expelling means includes means for stripping cores off said mandrel at said station.

15. The apparatus of claim 8, wherein said moving means includes a pivotable lever and said expelling means is mounted on said lever and is movable with said transfer member.

16. The apparatus of claim 15, wherein said moving means further comprises fluid-operated motor means for pivoting said lever.

17. The apparatus of claim 8, wherein said expelling means comprises an abutment for the roll which is engaged by said transfer member and means for displacing the abutment relative to said transfer member so as to disengage the core of the roll at said station from the transfer member.

18. The apparatus of claim 8, further comprising means for monitoring said path for the presence of rolls at said level, said monitoring means including means for generating signals in the absence of a roll at said level and said advancing means being responsive to said signals to set the conveyor in motion until a roll of the stack on said conveyor reaches said level.

19. The apparatus of claim 18, wherein said monitoring means includes photoelectric detector means and said advancing means includes an electric motor.

20. The apparatus of claim 8, wherein said threading means includes a catcher for the leader of the web at said station and means for moving the catcher relative to the roll at said station.

21. The apparatus of claim 20, wherein said catcher comprises a sensor arranged to generate a signal in response to detection of the leader of the web at said station, and means for attracting the leader by suction in response to said signal.

22. The apparatus of claim 21, wherein said catcher further comprises guide means for the web at said unwinding station.

23. The apparatus of claim 21, wherein said attracting means includes a suction cup.

24. The apparatus of claim 21, wherein said threading means further comprises web transporting means remote from said station, said means for moving said catcher including means for moving said attracting means between said station and said transporting means so that the leader of the web can be engaged and entrained by said transporting means.

25. The apparatus of claim 24, wherein said transporting means includes a pair of rollers defining a nip for the web.

26. The apparatus of claim 24, wherein said threading means further comprises means for looping the web between said station and said transporting means.

27. The apparatus of claim 26, wherein said looping means comprises a tensioning roller and means for moving said roller relative to the web between said station and said transporting means.

28. The apparatus of claim 24, further comprising means for guiding the web from the transporting means to the processing machine.

29. The apparatus of claim 28, wherein said guiding means comprises a mobile guide member and means for moving the guide member between a first position in which the guide member directs the leader of a web from said transporting means into the processing machine and a second position in which the web is free to form a loop between said transporting means and the processing machine.

30. The apparatus of claim 29, wherein said guide member is pivotable between said first and second positions.

31. The apparatus of claim 29, further comprising means for monitoring the size of the loop.

32. The apparatus of claim 31, wherein said monitoring means comprises a photoelectric detector.

* * * * *